United States Patent Office 3,077,331
Patented Feb. 12, 1963

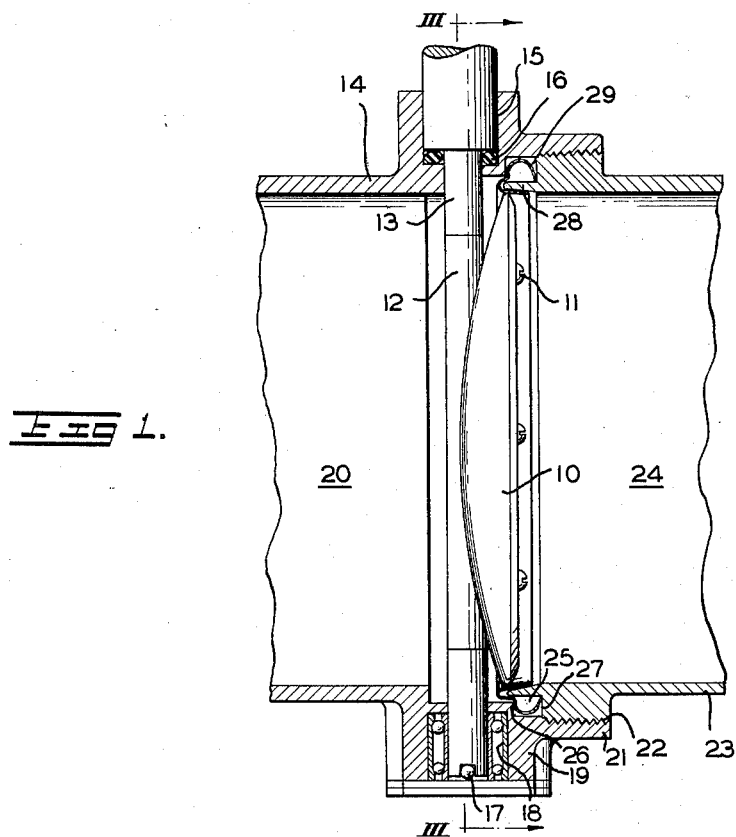
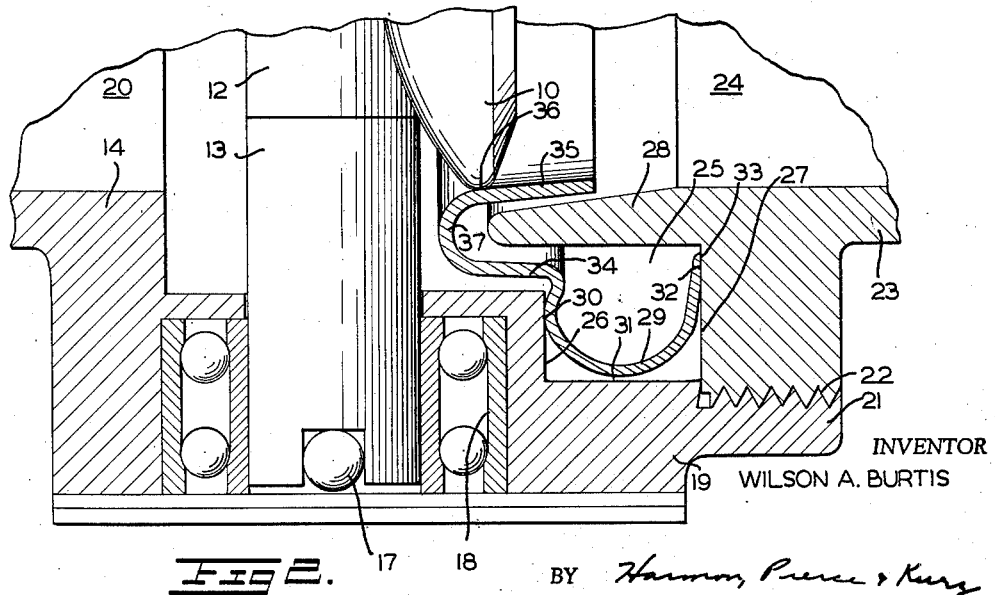

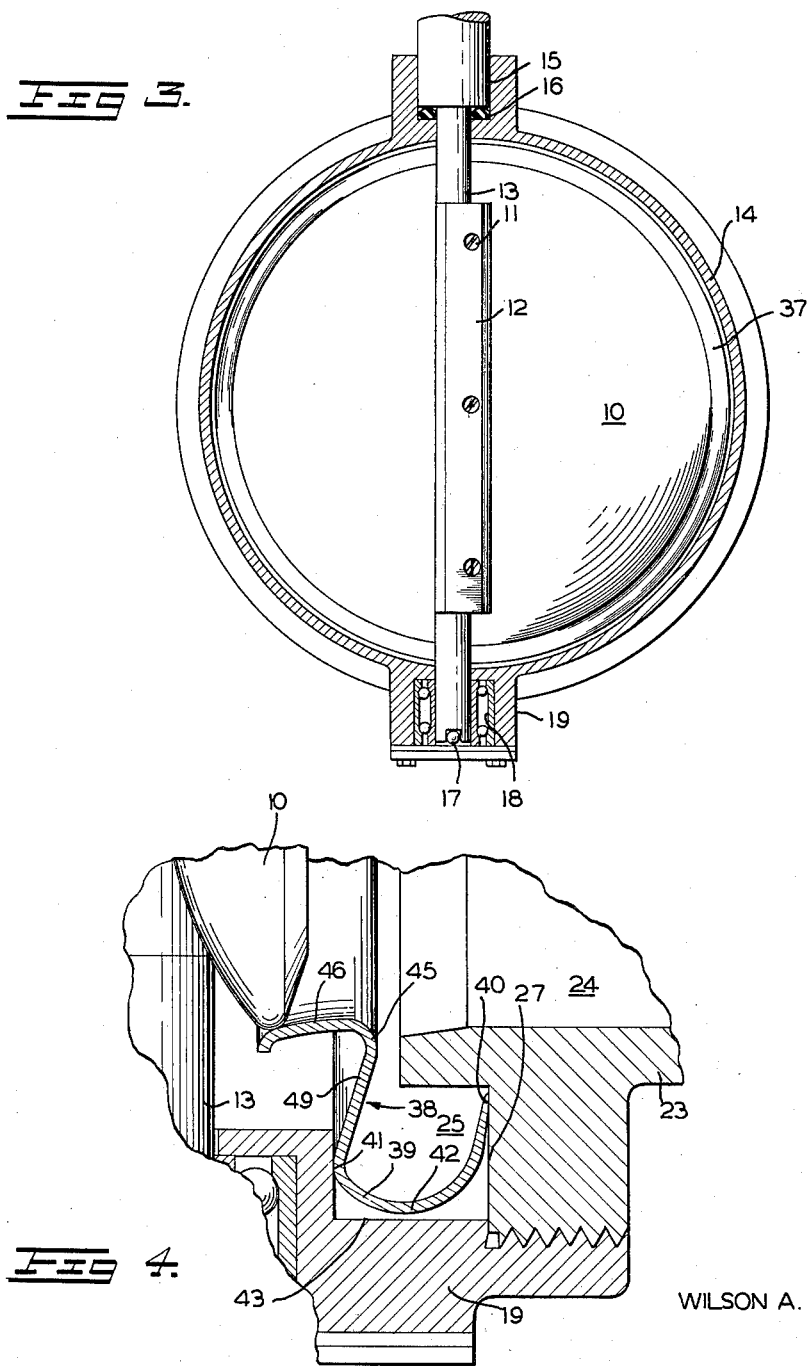

3,077,331
BUTTERFLY VALVE WITH RADIALLY SHIFTABLE
AND FLUID PRESSURE RESPONSIVE SEAT
Wilson A. Burtis, Sherman Oaks, Calif., assignor to Aero-Flow Dynamics, Inc., a corporation of New York
Filed May 11, 1959, Ser. No. 812,258
19 Claims. (Cl. 251—173)

This invention relates generally to valve structures and more particularly to improvements in butterfly valves.

The primary object of this invention is to provide an improved metal to metal seal between a butterfly valve disk and a valve seat.

A more specific object of this invention is to provide a valve structure of the butterfly type wherein a seat for the valve disk is rendered both shiftable and pressure responsive to obtain an efficient seal between the disk and the seat in a valve closed position.

Another object of this invention is to provide an improved and efficient valve seat for butterfly valves.

A further object of this invention is to provide an improved butterfly valve body structure for mounting therein a resilient valve seat.

A still further object of this invention is to provide a butterfly valve structure without sealing gaskets and wherein a strictly metal to metal seal is efficiently obtained between the valve disk and a shiftable valve seat, and between the valve seat and its mounting in the valve body.

With the foregoing and other objects in view, the invention resides in the following specification and appended claims, certain embodiments and details of construction being illustrated in the accompanying drawings in which:

FIGURE 1 is a fragmentary, partially sectioned view of the butterfly valve comprising this invention;

FIGURE 2 is an enlarged, fragmentary view of the lower portion of FIGURE 1 specifically illustrating the valve seat for the butterfly valve of this invention;

FIGURE 3 is a view in end elevation taken along the lines 3—3 of FIGURE 1; and

FIGURE 4 is a partially sectioned view, similar to FIGURE 2, illustrating a modified form of this invention.

Referring more particularly to the drawings, a butterfly valve disk 10 is illustrated as being secured by screws 11 to an offset portion 12 of an operating shaft 13. The shaft 13 extends outwardly in opposite directions through a valve body member 14. As viewed in FIGURES 1 and 3 the upper portion of the shaft 13 is rotatably supported by a plain bearing 15 integral with the body member 14. To this end of shaft 13 any suitable type of operating member (not shown), either manual or automatic, may be connected for rotating the shaft through a ninety degree arc from a passage opening to a passage closing position for the disk 10. A seal 16 is provided about the shaft 13 adjacent the bearing 15. The lower end of shaft 13 is carried on a ball bearing 17 and is supported for rotary movement thereon by a thrust bearing 18 carried in the recessed boss 19 of the body 14.

The mounting of the shaft 13 in the bearings 15 and 18 is such that the axis of the shaft is offset from the longitudinal axis of the circular passage 20 through the body 14, as will be evident in FIGURE 3, for a purpose to be described.

The terminal portion 21 of body 14 is internally threaded at 22 to mate with like threads on the exterior surface of a valve body member 23. As illustrated the body member 23 defines a circular internal passage 24 and constitutes the upstream or pressure side of the valve relative to the disk 10. The joint between the body members 14 and 23 when fully connected as in FIGURE 1 results in a recess 25 being formed between spaced shoulders 26 of body member 14 and 27 of body member 23. Overlying the recess 25 is a tapered lip terminal portion 28 of body member 23.

Positioned within the recess 25 is a valve seat 29. This valve seat 29 is designed to fit the recess 25 with slight, resiliently urged, friction contact at two points within the recess. It will be noted in FIGURES 1 and 2 that the arcuate, or substantially U-shaped body portion of the seat 29, makes contact with two walls of the recess at pointss 30 and 32. This is the operative position of the seat with pressure fluid acting thereon. The body portion of seat 29 is spaced somewhat from the bottom wall of the recess at 31 so that the seat may shift transversely of the valve body. The portion 33 of seat 29 is somewhat tapered to have a more extensive sealing contact with shoulder 27 of the recess 25. Integral with the arcuate body portion of the seat 29 is a portion 34 which extends outwardly of the recess 25 and downstream of the valve before being reversely curved upon itself to provide a portion 35 extending above the lip 28 of body 23 in an upstream direction. The portion 35 of seat 29 is somewhat angular to the interior walls of the body members 14 and 23 but does not extend substantially into the fluid path formed by passages 20 and 24. The valve disk 10, having a rounded edge contour at 36, is designed to seat against the portion 35 of the seat adjacent to the reversely curved portion 37 of the seat. With the disk 10 and the seat 29 being constructed of metal it will thus be seen that a sealed closing of the valve relies on a metal to metal contact between the two members.

Under varying temperature and manufacturing conditions it is not practical to normally expect an efficient seal between metal surfaces. The usual practice has been to rely upon flexible seats or upon flexible members secured to the valve disks to compensate for poor manufacturing tolerances or for expansion and contraction of the parts. This invention avoids the problems encountered by the prior art by freely mounting the seat 29 in the recess 25. That is the seat 29 is not fixedly secured to either body member 14 or 23 so that it may shift as required to properly seat with the valve disk 29. Being of a relatively stiff but resilient metal, the seat 29 is also capable of flexing somewhat under pressure from fluid entering the recess 25 from behind the portion 35 of seat 29 from the upstream passage 24 of the valve when the valve disk 10 is moved into contact with the seat. In other words, when the disk 10 contacts the seat, a differential pressure exists between passages 20 and 24 which will flex the portion 35 of seat 29 sufficiently to effect a seal between the parts to prevent further passage of fluid from upstream passage 24 to downstream passage 20.

In order to assist the breakaway and seating movements of the disk 10 relative to the portion 35 of seat 29, the operating axis of the shaft 13 is offset from the center or longitudinal axis of the valve. By having the axis offset, a lower torque is required to crack the valve toward an open position, since a small leverage advantage is achieved by the offset. Likewise in moving the disk 10 into contact with the valve seat portion 35, the gained leverage from the offset aids in shifting the seat, when necessary, to achieve full and prompt contact between the entire periphery of the disk and the seat.

By constructing the joint structure between the body members 14 and 23 so as to form the recess 25, it is possible to readily replace the seat 29 by merely unthreading the joint between these members. A new seat therefore may be readily installed in the valve to replace any seat which may become damaged due to pitting, warping or other causes.

In the modified form of the invention as illustrated in FIGURE 4, a seat 38 of different contour, but with similar operating characteristics, is provided to cooperate with valve disk 10. The seat 38 has an arcuate or U-shaped body portion 39 contacting the shoulder 27 of the recess at one tapered terminus 40. The body portion 39 also contacts the shoulder 26 at point 41. The base 42 of the body portion 39 is spaced from the bottom wall 43 of recess 25 to permit more freedom of seat 38 in the recess. The seat 38 further includes a relatively straight, integral portion 49 extending outwardly of the recess 25 to a point adjacent to the valve passage where it is bent over at 45 through an arc extending it somewhat into the main fluid passage and terminating in a downstream portion 46 which is at an angle divergent from the main fluid passage. The disk 10 when moved to a closed position against portion 46 of seat 38 will shift the seat sufficiently in recess 25, overcoming the light friction contact between the body portion 39 and the walls of the recess, to achieve an effective complete seating between the metal surfaces of the disk and the seat. When the disk engages the portion 46 of the seat 38 then the pressure of fluid from upstream passage 24 will act against straight portion 49 of seat 38 to flex the portion 46 into firm seating engagement with the periphery of disk 10.

Thus it will be obvious to one skilled in the art that the invention provides a simple and effective construction for obtaining effective seating between a butterfly valve disk and a shiftable seat where both elements are metal and where no flexible materials are required. Obvious modifications such as the contours of the seat element, the construction of the body members in forming the recess and the like are deemed to be well within the purview of this invention and the scope of the appended claims.

I claim:

1. A valve for fluid lines comprising a valve body with a through passage between a high pressure fluid inlet and an outlet, a butterfly valve disk pivotally secured to the body within the passage for movements between full open and full closed positions, a valve seat, and recess means in said passage to retain the valve seat within the body for limited shifting about the passage in a plane transverse to the axis of the passage, said valve seat having a first arcuate body portion in frictional point contact with said recess means and a second portion extending first radially inward and then generally axially of the passage and in a direction opposed to the pressure fluid flow from the inlet, said frictional point contact providing the sole attachment between said seat and said valve body, and said valve disk, when moved to a closed position, engaging said seat and shifting the same sufficiently to obtain full contact with the seat and said seat upon contact by the disk being urged by the pressure fluid into effective sealing relationship therewith.

2. A valve for fluid lines comprising a valve body with a through passage between a high pressure fluid inlet and an outlet, a metal butterfly valve disk pivotally secured to the body within the passage, means to move the disk between passage opening and passage closing positions, a metal valve seat, and recess means in the valve body to support and retain the valve seat for limited shifting of said entire valve seat about the passage in a plane transverse to the axis of the passage, said valve seat having a first arcuate body portion in frictional point contact with said recess means and a second portion extending first radially inward and then generally axially of the passage and in a direction opposed to the pressure fluid flow from the inlet, said frictional point contact providing the sole attachment between said seat and said valve body, and said valve disk, when moved to a closed position, engaging said seat and shifting the entire seat sufficiently to obtain full contact with the seat, and said seat upon contact by the disk being urged by the pressure fluid into effective sealing relationship therewith.

3. The invention according to claim 2 wherein the disk moving means is operable about an axis offset from the central longitudinal axis of the valve body.

4. A valve for fluid lines comprising a valve body with a through passage between a high pressure fluid inlet and an outlet, a butterfly valve disk pivotally secured to the body within the passage, means to move the disk between passage opening and passage closing positions, a valve seat, and recess means in the valve body to support and retain the valve seat for limited shifting of said entire valve seat about the passage in a plane transverse to the axis of the passage, said valve seat having a first arcuate body portion in frictional point contact with said recess means and a second body portion movably housed in the body recess and having a portion coextensive with said body portion extending first radially inward and then generally axially of the passage and in a direction opposed to the pressure fluid flow from the inlet, said frictional point contact providing the sole attachment between said seat and said valve body, and said valve disk when moved to a closed position, engaging said seat and shifting the same sufficiently to obtain full contact with the seat, and said seat portions upon contact by the disk with the inwardly extending portion of the seat being urged by the pressure fluid into effective sealing relationship with the disk and with the body recess.

5. The invention according to claim 4 wherein the disk moving means is operable about an axis offset from the central longitudinal axis of the valve body.

6. A valve for fluid lines comprising a valve body with a through passage between a high pressure fluid inlet and an outlet, a metal butterfly valve disk pivotally secured to the body within the passage, means to move the disk between passage opening and passage closing positions, a metal valve seat, and recess means in the valve body to support and retain the valve seat for limited shifting of said entire valve seat about the passage in a plane transverse to the axis of the passage, said valve seat having a first arcuate body portion movably housed in the body recess in frictional point contact therewith and having a second portion coextensive with said body portion extending first radially inward and then generally axially of the passage and in a direction opposed to the pressure fluid flow from the inlet, said frictional point contact providing the sole attachment between said seat and said valve body, said valve disk when moved to a closed position, engaging said seat and shifting the same sufficiently to obtain full contact with the seat, and said seat portions upon contact by the disk with the inwardly extending portion of the seat being urged by the pressure fluid into effective sealing relationship with the disk and with the body recess.

7. The invention according to claim 6 wherein the disk moving means is operable about an axis offset from the central longitudinal axis of the valve body.

8. A valve for fluid lines comprising a valve body with a through passage between a high pressure fluid inlet and an outlet, said valve body including a pair of members joined together through an axial joint, and said joint defining a recess between the body members with a pair of side walls and an outer wall, a shiftable, resilient valve seat, said valve seat having an arcuate body portion in light friction point contact with the side walls of the recess and having a portion coextensive with the downstream side of the body portion extending first inwardly of the passage and then generally axially of the passage toward the inlet, said light friction point contact providing the sole attachment between said seat and said valve body, a butterfly valve disk pivotally secured to the body within the passage, and means to move the disk between passage opening and passage closing positions, said valve disk, when moved to a closed position, engaging said shiftable valve seat and shifting the same sufficiently against the friction contact in the body recess to obtain full contact with the seat, and said seat portions upon contact by the disk with the inwardly and axially extending portion of the seat being urged by the pressure fluid into effective sealing relationship with the disk and with the walls of the body recess.

9. The invention according to claim 8 wherein the disk moving means is operable about an axis offset from the central longitudinal axis of the valve body.

10. A valve for fluid lines comprising a valve body with a through passage between a high pressure fluid inlet and an outlet, said valve body including a pair of members joined together through an axial joint, and said joint defining a recess between the body members with a pair of side walls and an outer wall, a shiftable, resilient valve seat, said valve seat having an arcuate body portion in light friction point contact with the side walls of the recess and having a portion coextensive with the downstream side of the body portion extending first inwardly of the passage and then generally axially of the passage toward the outlet, a butterfly valve disk pivotally secured to the body within the passage, and means to move the disk between passage opening and passage closing positions, said valve disk, when moved to a closed position, engaging said shiftable valve seat and shifting the same sufficiently against the friction contact in the body recess to obtain full contact with the seat, and said seat portions upon contact by the disk with the inwardly and axially extending portion of the seat being urged by the pressure fluid into effective sealing relationship with the disk and with the walls of the body recess.

11. The invention according to claim 10 wherein the disk moving means is operable about an axis offset from the central longitudinal axis of the valve body.

12. A valve for fluid lines comprising a valve body with a through passage between a high pressure fluid inlet and an outlet, said valve body including a recess surrounding said passage and being provided with side walls and an outer wall, a shiftable resilient valve seat, said valve seat having an arcuate body portion in light friction point contact with the side walls of the recess and having a portion coextensive with the downstream side of the body portion extending first inwardly of the passage and then generally axially of the passage toward the outlet, a butterfly valve disk pivotally secured to the body within the passage, and means to move the disk between passage opening and passage closing positions, said valve disk, when moved to a closed position, engaging said shiftable valve seat and shifting the same sufficiently against the friction contact in the body recess to obtain full contact with the seat, and said seat portions upon contact by the disk with the inwardly and axially extending portion of the seat being urged by the pressure fluid into effective sealing relationship with the disk and with the walls of the body recess.

13. The invention according to claim 12 wherein the disk moving means is operable about an axis offset from the central longitudinal axis of the valve body.

14. A valve comprising a valve body having a through passage between a pressure fluid inlet and an outlet, a valve disk pivotally secured to the body within the passage for movement between full open and full closed positions, a valve seat, and recess means in said passage to retain the valve seat within the body for limited shifting of said entire valve seat about the passage in a plane transverse to the axis of the passage, said valve seat having a first arcuate body portion in frictional point contact with said recess means and a second portion extending first radially inwardly and then generally axially of the passage toward the outlet, said valve disk, when moved to a closed position, engaging said seat and shifting the same sufficiently to obtain full contact with the seat and said seat upon contact by the disk being urged by the pressure of the fluid into effective sealing relationship therewith, and said frictional point contact providing the sole attachment between said seat and said valve body.

15. A valve for fluid lines comprising a valve body with a through passage between a high pressure fluid inlet and an outlet, a butterfly valve disk pivotally secured to the body within the passage, said disk having a rounded peripheral seating edge, means to move the disk between passage opening and passage closing positions, a valve seat located on the upstream side of said disk, said valve seat having a portion extending first inwardly and then generally axially of the passage and having an internal cylindrical surface which converges slightly in the direction of the inlet, and recess means in said passage to retain the valve seat within the body for limited shifting of said entire valve seat about the passage in a plane transverse to the axis of the passage, said valve seat further including an arcuate body portion in frictional point contact with said recess means, said valve disk, when moved to a closed position, engaging said seat and shifting the same sufficiently to obtain a full contact with the opposed converging cylindrical surface of said seat, said seat upon contact by the disk being urged by the force of the pressure fluid on the inwardly extending portion thereof into effective sealing relationship with said disc, and said frictional point contact providing the sole attachment between said seat and said valve body.

16. A valve comprising a valve body with a through passage, said valve body including an annular recess, a shiftable, resilient valve seat having an arcuate body portion, said arcuate body portion being in frictional point contact with the walls of said recess with clearance provided to permit transverse shifting of said entire seat within said passage, and a portion coextensive with the downstream side of the body portion extending first inwardly of the passage and then generally axially of the passage, a butterfly valve disk pivotally secured to the body within the passage, and operating shaft means connected to said disc for moving the disk between opening and closing positions, said frictional point contact providing the sole attachment between said seat and said valve body.

17. The invention according to claim 14 wherein the pivotal axis of the valve disk is offset from the central longitudinal axis of the valve body.

18. The invention according to claim 15 wherein the disk moving means is operable about an axis offset from the central longitudinal axis of the valve body.

19. The invention according to claim 16 wherein the disk moving means is operable about an axis offset from the central longitudinal axis of the valve body.

References Cited in the file of this patent

UNITED STATES PATENTS

| | | |
|---|---|---|
| 1,248,683 | Leach | Dec. 4, 1917 |
| 2,059,656 | Ring | Nov. 3, 1936 |
| 2,789,785 | Woods | Apr. 23, 1957 |
| 2,816,729 | Jensen | Dec. 17, 1957 |
| 2,886,062 | Wheatley | May 12, 1959 |
| 2,892,609 | Bibbo | June 30, 1959 |
| 2,893,682 | Hintzman | July 7, 1959 |

FOREIGN PATENTS

| | | |
|---|---|---|
| 753,860 | Great Britain | Aug. 1, 1956 |